(12) United States Patent
Simard-Bergeron

(10) Patent No.: US 11,346,393 B2
(45) Date of Patent: May 31, 2022

(54) NO PIN COMPLIANT JOURNAL BEARING SHAFT FOR ONE PART CARRIER

(71) Applicant: PRATT & WHITNEY CANADA CORP., Longueuil (CA)

(72) Inventor: Julien Simard-Bergeron, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 440 days.

(21) Appl. No.: 16/426,415

(22) Filed: May 30, 2019

(65) Prior Publication Data

US 2020/0378436 A1      Dec. 3, 2020

(51) Int. Cl.
*F16C 17/02*     (2006.01)
*F16H 57/08*     (2006.01)

(52) U.S. Cl.
CPC .......... *F16C 17/02* (2013.01); *F05D 2220/32* (2013.01); *F05D 2230/60* (2013.01); *F05D 2240/50* (2013.01); *F05D 2260/40* (2013.01); *F16C 2360/23* (2013.01); *F16H 2057/085* (2013.01)

(58) Field of Classification Search
CPC ............... F16H 57/023; F16H 57/0479; F16H 2057/082; F16H 2057/085
See application file for complete search history.

(56) References Cited

U.S. PATENT DOCUMENTS

| | | | | |
|---|---|---|---|---|
| 6,223,616 B1 * | 5/2001 | Sheridan | ............. | F16H 57/0482 74/468 |
| 6,964,155 B2 * | 11/2005 | McCune | ................... | F02C 7/36 384/297 |
| 7,285,052 B1 * | 10/2007 | Rowell | ..................... | F16C 3/02 464/183 |
| 8,333,678 B2 * | 12/2012 | McCune | ............... | F01D 25/162 475/331 |
| 8,506,446 B2 * | 8/2013 | Minadeo | ............... | F16H 57/082 475/346 |
| 8,771,124 B2 | 7/2014 | Norem et al. | | |
| 10,816,087 B2 * | 10/2020 | Nique | .................... | F16H 57/082 |
| 2004/0128978 A1 * | 7/2004 | McCune | ................ | F16H 57/082 60/226.1 |
| 2010/0331139 A1 * | 12/2010 | McCune | .................... | F02C 7/36 475/331 |
| 2010/0331140 A1 * | 12/2010 | McCune | ............... | F01D 25/162 475/331 |

(Continued)

FOREIGN PATENT DOCUMENTS

DE      102017117689 A1 *   9/2018   ........... F16H 57/082
WO      2014184583 A1      11/2014

*Primary Examiner* — Topaz L. Elliott
(74) *Attorney, Agent, or Firm* — Norton Rose Fulbright Canada LLP

(57) ABSTRACT

A journal bearing comprising a central member and at least a first end member separated from the central member by a first undercut having an undercut diameter U1, an outer cylindrical surface of the first end member being axially spaced from an outer cylindrical surface of the central member, wherein the outer cylindrical surface of the first end member has a diameter A, the outer cylindrical surface of the central member has a diameter B, and wherein diameter B is greater than diameter A, and diameter A is greater than diameter U1.

12 Claims, 3 Drawing Sheets

(56) References Cited

U.S. PATENT DOCUMENTS

| | | | |
|---|---|---|---|
| 2016/0201793 A1* | 7/2016 | Muldoon | F16H 1/28 |
| | | | 475/159 |
| 2018/0313404 A1* | 11/2018 | Hoelzl | F16H 57/0479 |
| 2019/0162293 A1* | 5/2019 | Nique | F16H 1/2836 |
| 2019/0321892 A1* | 10/2019 | Nies | F03D 15/00 |
| 2020/0003069 A1* | 1/2020 | Maguire | F01D 25/16 |

* cited by examiner

NO PIN COMPLIANT JOURNAL BEARING SHAFT FOR ONE PART CARRIER

TECHNICAL FIELD

The present invention relates generally to mounting devices for rotating assemblies of gas turbine engines, and more particularly to journal bearings for such engines.

BACKGROUND

Turbine engines typically includes a number of rotating components or parts mounted together via mounting devices providing suitable support and allowing axial and/or rotational movement between such components. Those mounting devices may be journal bearings.

A conventional design of journal bearing requires a pin and a shaft mounted on the pin. The pin is used in order to be able to assemble the shaft to a single part carrier. However, if the journal bearing diameter is small, the pin is limited to its possible diameter and, when exposed to stresses, may deform.

SUMMARY

In one aspect, there is provided a journal bearing comprising a central member and at least a first end member separated from the central member by a first undercut having an undercut diameter U1, an outer cylindrical surface of the first end member being axially spaced from an outer cylindrical surface of the central member, wherein the outer cylindrical surface of the first end member has a diameter A, the outer cylindrical surface of the central member has a diameter B, and wherein diameter B>diameter A>diameter U1.

In another aspect, there is provided a gas turbine engine comprising a gearbox, the gearbox having a gear carrier with a first support and a second support spaced apart from one another and defining a rotational axis, a journal bearing being pin-less and having a central member between a first end and a second end, the first end and the second end being respectively received in the first support and the second support, a first end member at the first end being separated from the central member by a first undercut having an undercut diameter U1, wherein an outer cylindrical surface of the first end member has a diameter A, the outer cylindrical surface of the central member has a diameter B, and wherein diameter B>diameter A>diameter U1, and a gear supported by the central member and configured to rotate relative to the rotational axis.

In a further aspect, there is provided a method for installing a journal in a carrier comprising: positioning a gear between a first support and a second support of the carrier, the first support and the second support defining a rotational axis, inserting a first end of a journal in the second support, passing the first end of the journal through the gear by moving the journal through the second support and along the rotational axis, inserting the first end of the journal in the first support while inserting a second end of the journal in the second support.

BRIEF DESCRIPTION OF THE DRAWINGS

Reference is now made to the accompanying figures in which.

DETAILED DESCRIPTION

Figure 1:
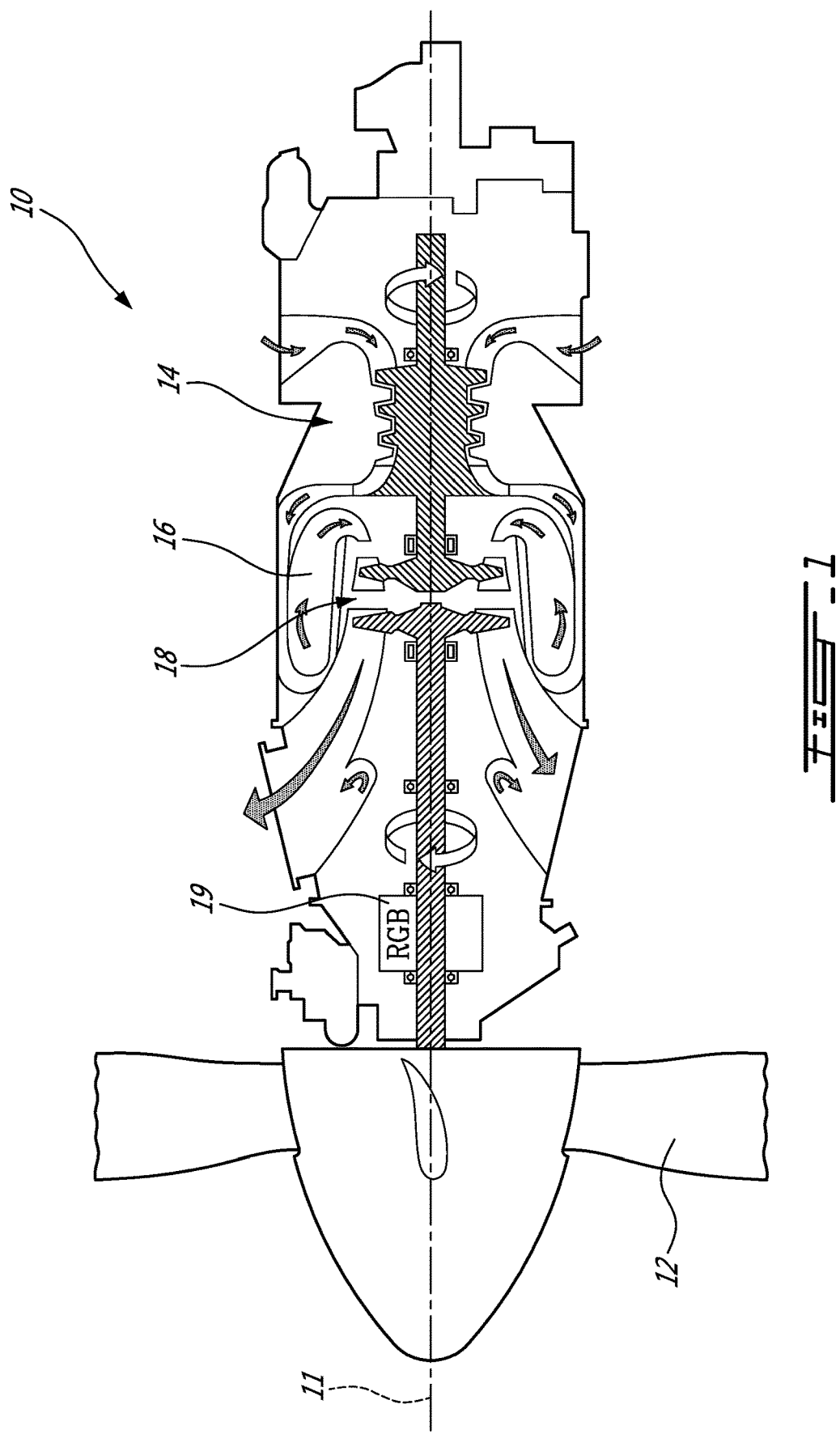
FIG. 1 is a schematic cross-sectional view of a gas turbine engine with a bearing journal assembly of the present disclosure.

FIG. 1 illustrates a gas turbine engine 10 of a type preferably provided for use in subsonic flight and configured for driving a load 12, such as, but not limited to, a propeller or a helicopter rotor or rotorcraft rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

Figure 2:
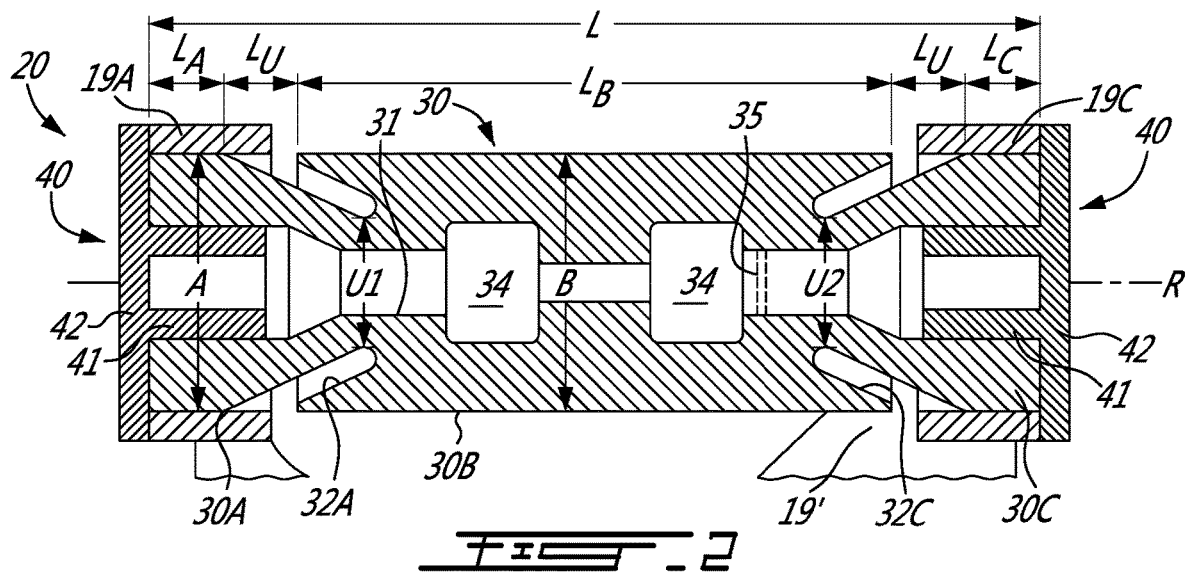
FIG. 2 is a sectional view of a journal bearing assembly in accordance with an embodiment of the present disclosure.
Figure 3:
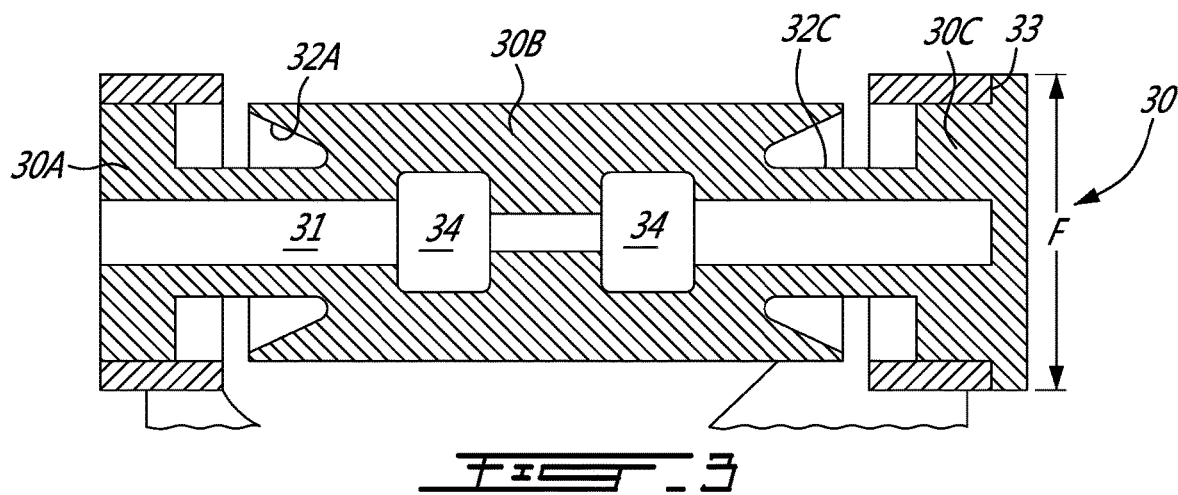
FIG. 3 is a sectional view of a journal bearing assembly in accordance with another embodiment of the present disclosure.
Figure 5A:
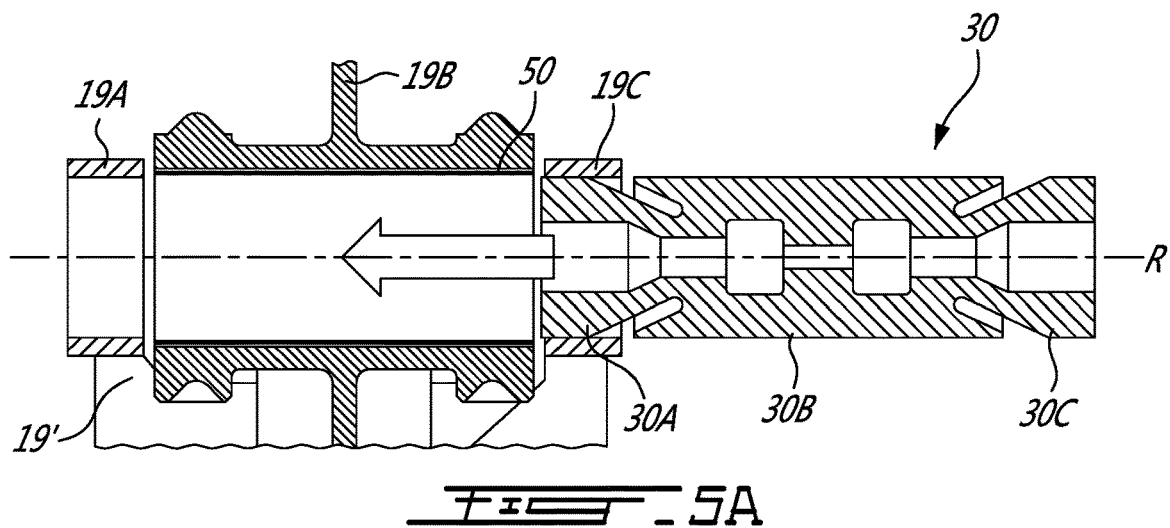
FIGS. 5A to 5C illustrate a method for installing a journal in a carrier in accordance with another embodiment of the present disclosure.
Figure 5B:
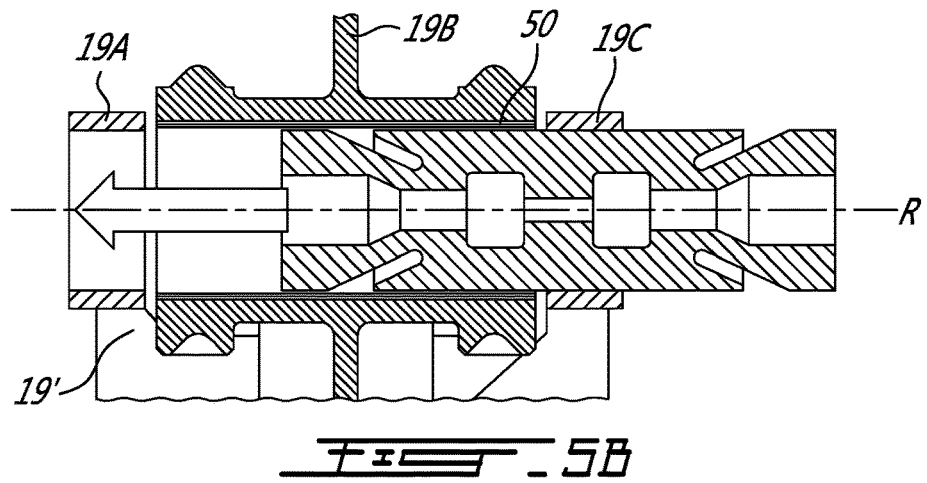
Figure 5C:
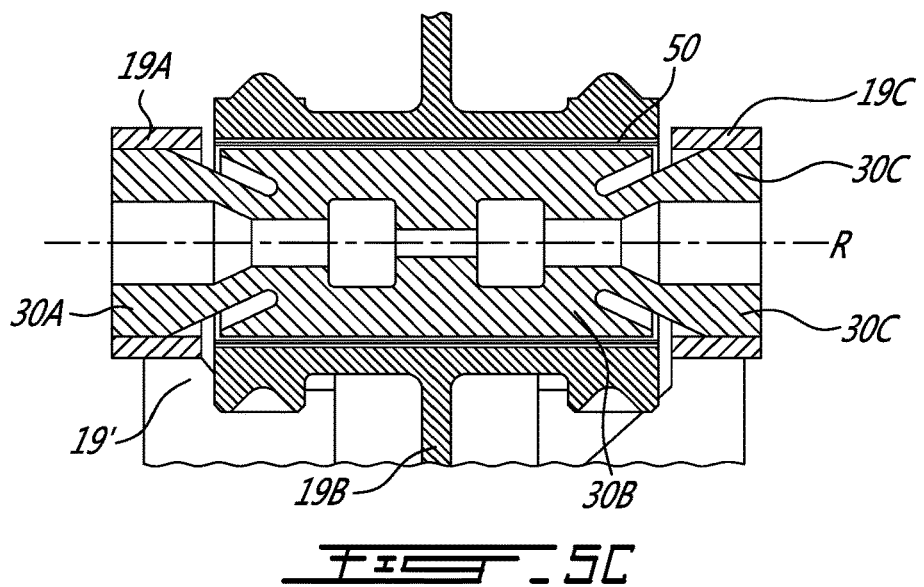

The gas turbine engine 10 also includes rotating parts or assemblies, such as gear assemblies 19 (e.g., epicycle reduction systems, planetary/reduction gearboxes (RGB), or other types of rotating assemblies) with rotating components mounted thereto using mounting devices allowing rotational and/or axial movement. In the embodiment shown, the gear assembly 19 is mounted at the front end of the engine 10, though it may be at other locations in the engine 10. An example of a gear assembly 19 as used in the engine 10 is shown in FIGS. 2, 3 and 5. In the depicted embodiment, the gear assembly 19 is part of an epicycle reduction system, also known as epicyclic gear train, epicyclic gearbox, planetary gearbox, etc., including one or more mounting devices, which is in FIG. 2 a journal bearing assembly 20 having a journal 30, also referred to as a shaft, journal shaft, journal bearing. The journal bearing assembly 20 may be used for interfacing a structure 19' having supports 19A, 19C to a rotating part 19B. The journal bearing assembly 20 may include one or more of a journal or shaft 30, fastener(s) 40 and a sleeve 50 (FIGS. 5A-5C). Such sleeve 50 may be used to form an outer peripheral surface of the journal bearing assembly 20. Otherwise, the outer periphery/surface of the journal 30 may contact directly the rotating part 19B it supports.

In the example shown, the rotating part 19B is a gear, such as a planet. The gear may be an epicycle gear of epicycle reduction system, mounted on the journal bearing assembly 20 which is supported at both ends between two axially spaced supports 19A, 19C forming at least part of the structure 19' of the epicycle gear system, the structure 19' being for instance a carrier. In an embodiment, there are more than one of the planets 19B on the carrier 19' (e.g., three planets 19B). The supports 19A, 19C may be annular blocks supporting the journal 30 at its opposed ends. The supports 19A, 19C may define receptacles for directly receiving therein the ends of the journal 30. The connection between the supports 19A, 19C and the ends of the journal 30 may for instance be a snug fit, an interference fit, a force fit. In an embodiment, there is little or no play between the supports 19A, 19C and the journal 30. Some fasteners and/or abutments may also be used to secure the journal 30 in the supports 19A, 19C, as detailed below. The supports 19A, 19C concurrently define a rotational axis, that is coincident with axis R of the journal bearing assembly 20. The rotation axis of the supports 19A, 19C is that about which the rotating part 19B rotates. It may differ from the rotational axis of the carrier 19', i.e., it may be regarded as being orbital. In yet another embodiment, the supports 19A, 19C are part of a single-piece carrier 19'. This entails that the supports 19A, 19C are jointly part of a monolithic component, i.e., the single-piece carrier 19'. Stated differently, the supports 19A, 19C are integral to one another, and are not mated or releasably connected.

Figure 4:
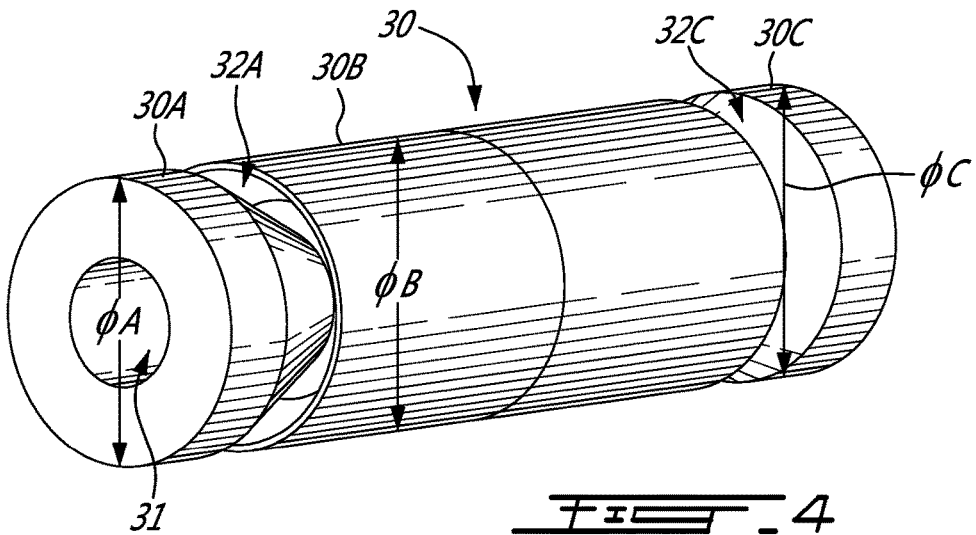
FIG. 4 is a perspective view of the journal bearing assembly of FIG. 2.

Referring to FIGS. 2 and 4, an embodiment of the journal 30 of the journal bearing assembly 20, is illustrated relative to the carrier 19' (FIG. 2) and in isolation (FIG. 4). The journal 30 may be a monolithic piece, i.e., it is made of a single material in a monoblock fashion, though it may also be an assembly of components, using permanent fastening such as welding, brazing, bonding. Depending on the configuration, the journal bearing assembly 20 may have its journal 30 fixed to the supports 19A, 19C, such that the sleeve 50 (if present) or the rotating part 19B rotates about the journal 30. If present, the sleeve 50 concurrently rotates with the rotating part 19B fixed thereon. In another embodiment, the journal bearing assembly 20 may have its journal 30 rotatably engaged with the rotating part 19B it supports, such that the journal 30 may be rotatably connected to the supports 19A, 19C.

The journal 30 has opposite end members 30A, 30C at its opposite ends, separated by a central member 30B. The journal 30 extends along the longitudinal axis R, which longitudinal axis R is the rotation axis of the rotating part 19B. The journal 30 has an inner cavity 31, that may be a throughhole as in FIG. 2, extending along the longitudinal axis R. Stated differently, the journal 30 may be tubular, with both ends opened, with a single open end, with the open end(s) configured to receive fasteners or plugs, and with the inner cavity 31 configured for example to receive oil or like lubricant. The journal 30 has an axial length L (along longitudinal axis R) defined between the opposite axial end members 30A, 30C. The length L may be divided in lengths LA, LB and LC, respectively for the axial end member 30A, the central member 30B, and the axial end member 30C, with undercut lengths LU separating LA from LB, and LB from LC. In an embodiment, the ratios LB/LA and LB/LC range from 2.0 to 6.0, though they may be outside of this range as well. The axial end members 30A, 30C may be received in the supports 19A, 19C as shown in FIG. 2, while the central member 30B is interfaced to the rotating part 19B.

In the embodiment shown, the outer surfaces of the end members 30A, 30C and/or of the central member 30B are cylindrical surfaces, such as smooth, continuous surfaces, though slots, surface features, etc, may be present. Undercuts 32A and/or 32C (concurrently, undercuts 32) are located in the journal 30, i.e., at one or both of ends of the journal 30. The journal 30 may have only undercut 32A at one axial end, and no undercut 32C at the opposite axial end in some embodiments, or vice versa. The undercuts 32A, 32C are configured for allowing radial compliance or flexibility to the journal bearing assembly 20. Each of the two undercuts 32A, 32C is located at a respective one of journal first and second ends, and separate the central body 30B from the end members 30A, 30C. Each of the two undercuts 32A, 32C defines an annular channel circumferentially extending around the longitudinal axis R, and opening to a side wall of the journal 30.

The undercuts 32A and 32C may have different geometries. For example, in FIG. 2, the surfaces delimiting the undercuts 32A and 32C are frusto conical, or conical segments. The frusto conical may, as in FIG. 2, converge toward the central member 30B. In FIG. 3, one of the surfaces delimiting the undercuts 32A and 32C is frusto conical, while another surface is a flat disk. Both surfaces may be flat disks.

The end members 30A, 30C may thus be cantilevered relative to the central member 30B. In other words, the journal bearing assembly 20 comprises a tubular body, which forms the central member 30B, with concentric tubular subsections extending axially from the central member 30B, i.e., the end members 30A and/or 30C. The undercuts 32A, 32C are defined between these concentric tubular subsections 30A, 30C and the central member 30B on opposed sides of the journal 30. The cantilevered end members 30A, 30C may thus allow the journal 30 to be compliant and deflect upon receiving journal bearing loads.

The end members 30A, 30C may flare (FIG. 2) or may be enlarged (FIG. 3) relative to the undercuts 32A, 32C. This may be expressed in terms of dimensions, such as diameters. The end member 30A has a diameter A, the central member 30B has a diameter B, and the end member 30C has a diameter C. The undercuts 32A and 32C have diameters U1 and U2, respectively. The diameters U1 and U2 may be measured at the depth of the undercuts 32A, 32C. In an embodiment U1=U2. If the journal 30 has a single end member, such as 30A, the journal 30 complies with diameter B>diameter A>diameter U1. If the journal 30 also has a second end member, such as 30B, the journal complies with diameter C≥diameter B. Consequently, diameter C≥diameter B>diameter A>diameters U1, U2. Stated differently, the end member 30C is larger than the end member 30A.

Referring to FIG. 3, a flange or like abutment 33 may be located at the larger end of the journal 30. For example, if the end member 30C is present, the flange 33 may be attached or integral to it. The flange 33 may be monolithic with the end member 30C, or may be attached to it, such as by welding, brazing, bonding, etc. The flange 33 has a diameter or largest radially-oriented dimension F, and dimension F>diameter C.

A lubricating fluid film, such as an oil film, may be received between rotating components of the journal bearing assembly 20 to facilitate rotation of said components relative to one another. The outer surface of the central member 30B may define an outer recess to receive and host an oil film for the rotating part 19B or sleeve 50 to rotate relative to the outer surface of the central member 30B of the journal 30. The recess may have a frusto-circular geometry, such as defined by a flat plane in the outer annular surface of the journal 30. Other geometries are considered, such as annular. In an embodiment in which the recess is not annular, the recess is located on a top half of the journal 30 for oil to be assisted by gravity to fill a play between the journal 30 and the sleeve or rotating part 19B. In another embodiment, a recess equivalent to the recess may be located in the inner surface of the sleeve (if present) instead of in the outer surface of the central member 30B of the journal 30. In an embodiment, a length of the recess extends to the undercuts 32.

Oil passages (not shown) may extend through the body of the journal 30, from a surface of the recess to the inner cavity 31. In an embodiment, the inner cavity 31 has enlarged portion(s) 34 that may act as a reservoir for lubricant. Moreover, a diameter of the inner cavity 31 may be large enough to receive a strainer 35, if necessary.

Referring to FIGS. 2 and 3, fasteners 40 may be used to hold the journal 30 captive between the supports 19A, 19C. The fasteners 40 may be referred to as plugs, male connectors, end caps, end members, etc. In an embodiment, the fasteners 40 have a male portion 41 that penetrates the inner cavity 31. Between them, there may be a threading engagement, a wedged force fit or interference fit, etc. The fasteners 40 may have a cap portion 42 that extends beyond the journal 30, to form a shoulder for abutment with the supports 19A, 19C. As shown in FIGS. 2 and 3, there may be one or two fasteners 40 for the journal 30 to be held captive in the supports 19A, 19C. In an embodiment, such as in FIG. 3, the end member 30A may be sufficiently tight in the support 19A for fasteners 40 not to be necessary.

Referring to FIGS. 5A-5C, there is illustrated a method for installing a journal, such as the journal 30, in a structure, such as the carrier 19'. In (a), a gear 19B is positioned between a first support 19A and a second support 19C of the carrier 19'. A sleeve 50 may also be in the gear 19B. The first support 19A and the second support 19C define a rotational axis, shown as R. A first end 30A of the journal 30 is inserted in the second support 19C. It one were to attempt inserting the second end 30C of the journal 30 through the first support 19A, the journal 30 would be blocked from doing so. The first end 30A of the journal 30 is passed through the gear 19B by moving the journal 30 through the second support 19C and along the rotational axis R. The first end 30A of the journal 30 is then inserted (i.e., enters) in the first support 19A while the second end 30C of the journal 30 enters the second support 19C. In an embodiment, a flange 33 at the second end 30C of the journal 30 is abutted against the second support 19C. Fastener(s) 40 may be connected to the end(s) 30A and/or 30C of the journal 30, whereby the journal 30 is held captive in the carrier 19'. The method may then be repeated for installing another one of the journals 30 in the carrier 19'.

The above description is meant to be exemplary only, and one skilled in the art will recognize that changes may be made to the embodiments described without departing from the scope of the invention disclosed. The journal 30 may be said to be pin-less, in that no pin is required to interface the journal 30 to the structure 19'. The ends of the journal 30 are directly connected to and/or interfaced to the supports 19A, 19C, of the structure 19'. Still other modifications which fall within the scope of the present invention will be apparent to those skilled in the art, in light of a review of this disclosure, and such modifications are intended to fall within the appended claims.

The invention claimed is:

1. A journal bearing comprising a central member and at least a first end member separated from the central member by a first undercut having an undercut diameter U1, and a second end member separated from the central member by a second undercut having an undercut diameter U2, an outer cylindrical surface of the first end member being axially spaced from an outer cylindrical surface of the central member and an outer cylindrical surface of the second end member being axially spaced from the outer cylindrical surface of the central member, the outer cylindrical surface of the first end member having a diameter A, the outer cylindrical surface of the second end member having a diameter C, the outer cylindrical surface of the central member having a diameter B, and diameter C diameter≥B>diameter A>diameter U1.

2. The journal bearing according to claim 1, wherein the central member, the first end member and the second end member are a monolithic piece.

3. The journal bearing according to claim 2, wherein the monolithic piece is tubular.

4. The journal bearing according to claim 3, wherein the monolithic piece has at least one open end.

5. The journal bearing according to claim 1, comprising a flange at an axial end of the second end member, the flange having a diameter F>diameter C.

6. The journal bearing according to claim 5, wherein the central member, the first end member, the second end member, and the flange are a monolithic piece.

7. A gas turbine engine comprising
a gearbox, the gearbox having a single piece gear carrier with a first support and a second support spaced apart from one another and defining a rotational axis,
a journal bearing being pin-less and having a central member between a first end and a second end, the first end and the second end being respectively received in the first support and the second support, a first end member at the first end being separated from the central member by a first undercut having an undercut diameter U1, an outer cylindrical surface of the first end member having a diameter A, an outer cylindrical surface of the central member having a diameter B, and diameter B>diameter A>diameter U1, and
a gear supported by the central member and configured to rotate about the rotational axis.

8. The gas turbine engine according to claim 7, wherein the journal bearing has a second end member at the second end separated from the central member by a second undercut having an undercut diameter U2, an outer cylindrical surface of the second end member being axially spaced the outer cylindrical surface of the central member, the outer cylindrical surface of the second end member having a diameter C≥diameter B.

9. The gas turbine engine according to claim 8, wherein the central member, the first end member and the second end member are a monolithic piece.

10. The gas turbine engine according to claim 9, wherein the journal bearing is tubular.

11. The gas turbine engine according to claim 10, wherein the journal bearing has at least one open end.

12. The gas turbine engine according to claim 8, comprising a flange at an axial end of the second end member, the flange having a diameter F>diameter C.

* * * * *